United States Patent [19]

Opperthauser

[11] Patent Number: 4,770,286
[45] Date of Patent: Sep. 13, 1988

[54] WORKPIECE ELEVATOR

[75] Inventor: Keith G. Opperthauser, Holly, Mich.

[73] Assignee: Automated Systems, Inc., Pontiac, Mich.

[21] Appl. No.: 930,930

[22] Filed: Nov. 17, 1986

[51] Int. Cl.$^4$ .............................................. B65G 65/00
[52] U.S. Cl. ............................. 198/476.1; 198/463.5; 198/802; 414/648
[58] Field of Search ...................... 198/801, 476.1, 706, 198/477.1, 365, 802, 367, 463.5; 414/564, 565, 598, 603, 609, 617, 639, 648, 649, 647

[56] References Cited

U.S. PATENT DOCUMENTS

| 278,050 | 5/1883 | Ruddell | 198/365 |
| 445,610 | 2/1891 | Ruddell | 198/802 |
| 1,142,453 | 6/1915 | Olson | 198/706 X |
| 4,082,179 | 4/1978 | Beyer | 198/801 |
| 4,199,051 | 4/1980 | Kimberley | 1989/801 X |
| 4,214,848 | 7/1980 | Verwey et al. | 198/475.1 X |

*Primary Examiner*—Robert J. Spar
*Assistant Examiner*—Jennifer L. Doyle
*Attorney, Agent, or Firm*—Harness, Dickey & Pierce

[57] ABSTRACT

A workpiece elevator for moving plural workpieces from an intake station vertically to an elevated discharge station. The workpiece elevator includes a bucket assembly which is pivotable in response to engagement with cam bars such that in one rotated position, the bucket engages the workpieces and carries them to the discharge station where the bucket is rotated to a discharging position. The bucket assembly includes a pair of cam followers disposed on opposite sides of a plate which engage elongated cam bars affixed to the elevator frame. Means are also provided for limiting the angular range of motion of the bucket assemblies. The elevator in accordance with the second embodiment includes means for enabling the elevator to be easily modified to accommodate different configurations and sizes of workpieces. A pair of separated channels are mounted to the frame amd extend between the intake and discharge stations to laterally support the workpiece. Further, means are provided for varying the number of workpieces loaded onto the bucket assembly, thereby enhancing the range of application of the elevator.

16 Claims, 5 Drawing Sheets

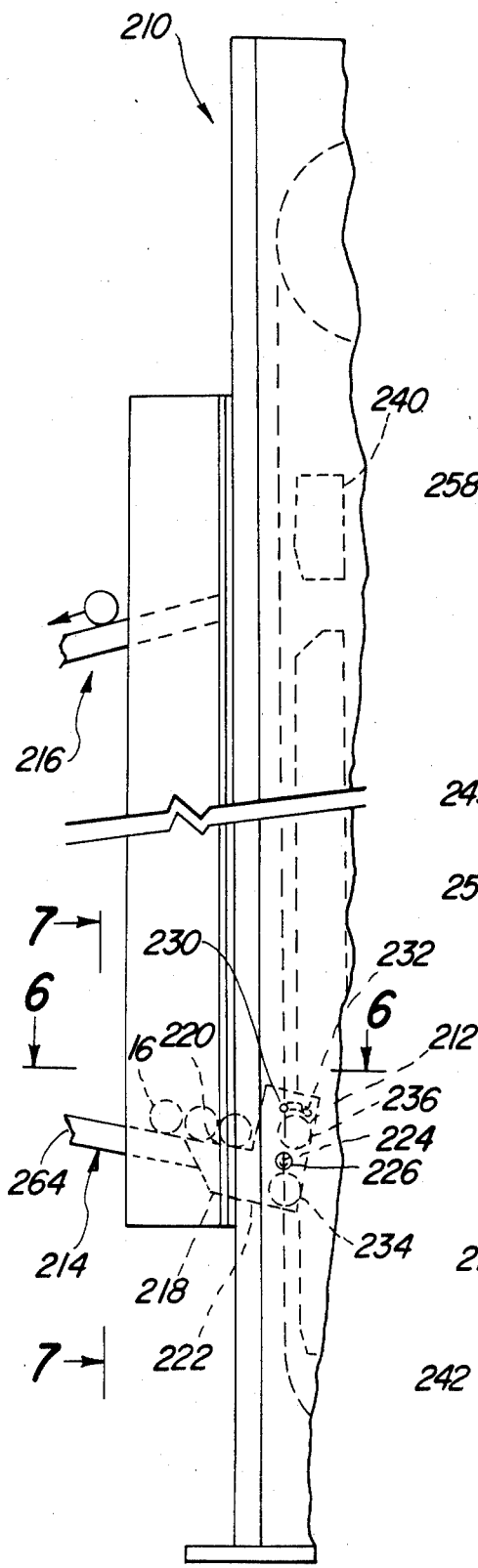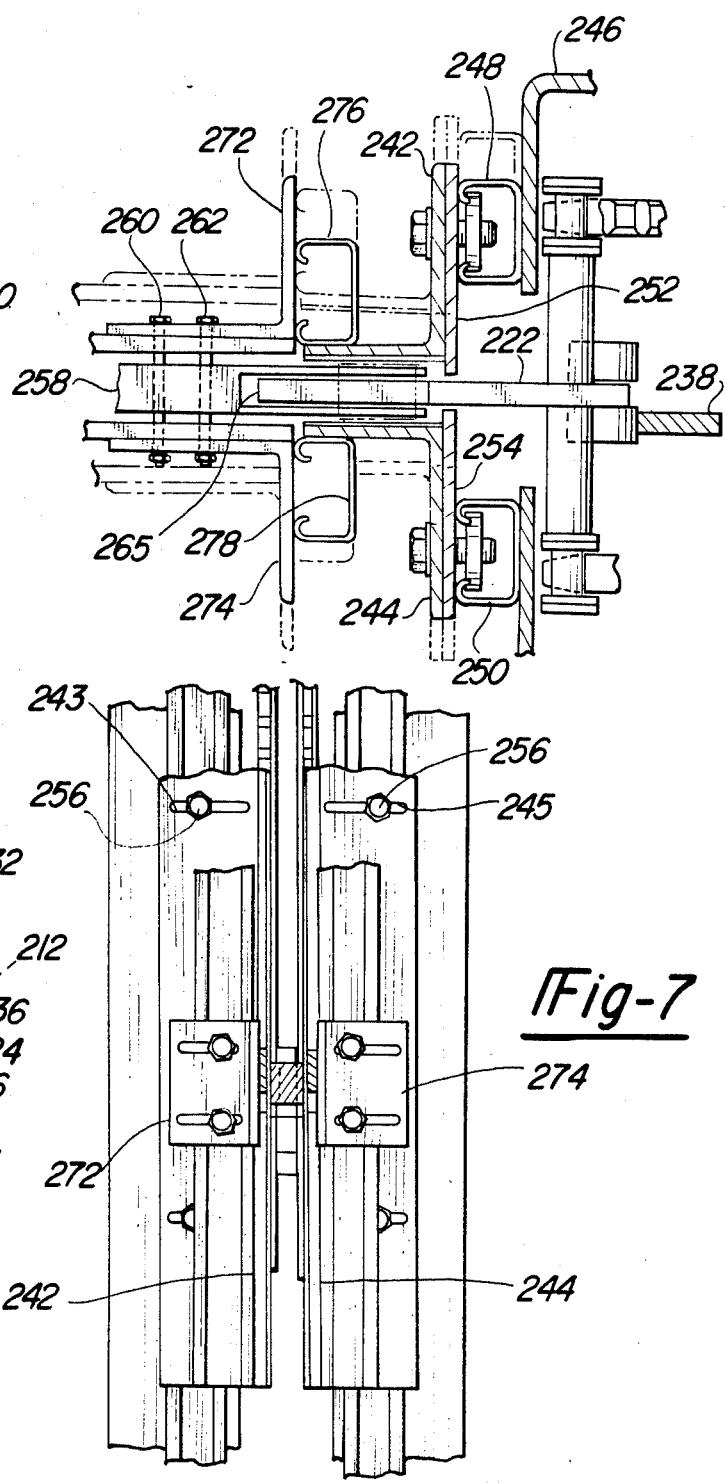

WORKPIECE ELEVATOR

BACKGROUND OF THE INVENTION

This invention relates to a material handling device and particularly to an elevator system designed to move workpieces from a lower level to a higher level as part of a manufacturing or warehousing operation.

During part fabrication, assembly or storage operations, it is frequently necessary to elevate workpieces from a lower level to an elevated position. For example, many factory operations employ gravity feed conveyors which require that the workpieces be elevated to continue their flow or to be loaded into a storage device. Designers of workpiece elevators strive to provide high reliability in properly loading and unloading the workpieces. Since a given elevator device may be used for transporting various types of workpieces during its operational life, it is further desirable to provide an elevator device which is easily adapted to accommodate workpieces of various sizes and configurations.

SUMMARY OF THE INVENTION

In accordance with the present invention, a workpiece elevator assembly is provided having the above-mentioned desirable features. The workpiece elevator in accordance with the first embodiment of this invention employs a plurality of bucket assemblies which are moved by a driven chain in a generally vertical direction. The bucket assemblies include cam followers which interact with cam bars which cause the buckets to rotate from a workpiece engaging and carrying position, to a workpiece dumping position. The cam bars are positioned so that the bucket assemblies are oriented in the workpiece engaging position at the part intake station at a lowermost level of the elevator and are actuated to move to the workpiece discharge position at the upwardly displaced discharge station position.

The workpiece elevator in accordance with the second embodiment of this invention possesses the advantages and features of the elevator according to the first embodiment, and further provides means for enabling the elevator to be easily modified to accommodate varying sizes and configurations of workpieces, thereby reducing equipment down time and labor involved in reworking the device.

Additional benefits and advantages of the present invention will become apparent to those skilled in the art to which this invention relates from the subsequent description of the preferred embodiments and the appended claims taken in conjunction with the accompanying drawings.

BRIEF DESCRIPTION OF THE DRAWINGS

FIG. 5 is a partial side view showing a second embodiment of a workpiece elevator according to this invention;

FIG. 6 is a cross-sectional view taken along line 6—6 of FIG. 5, particularly showing the components at the elevator intake station; and FIG. 7 is a front elevational view of the elevator shown in FIG. 5 taken in the direction of Arrow 7.

DETAILED DESCRIPTION OF THE INVENTION

Figure 1:
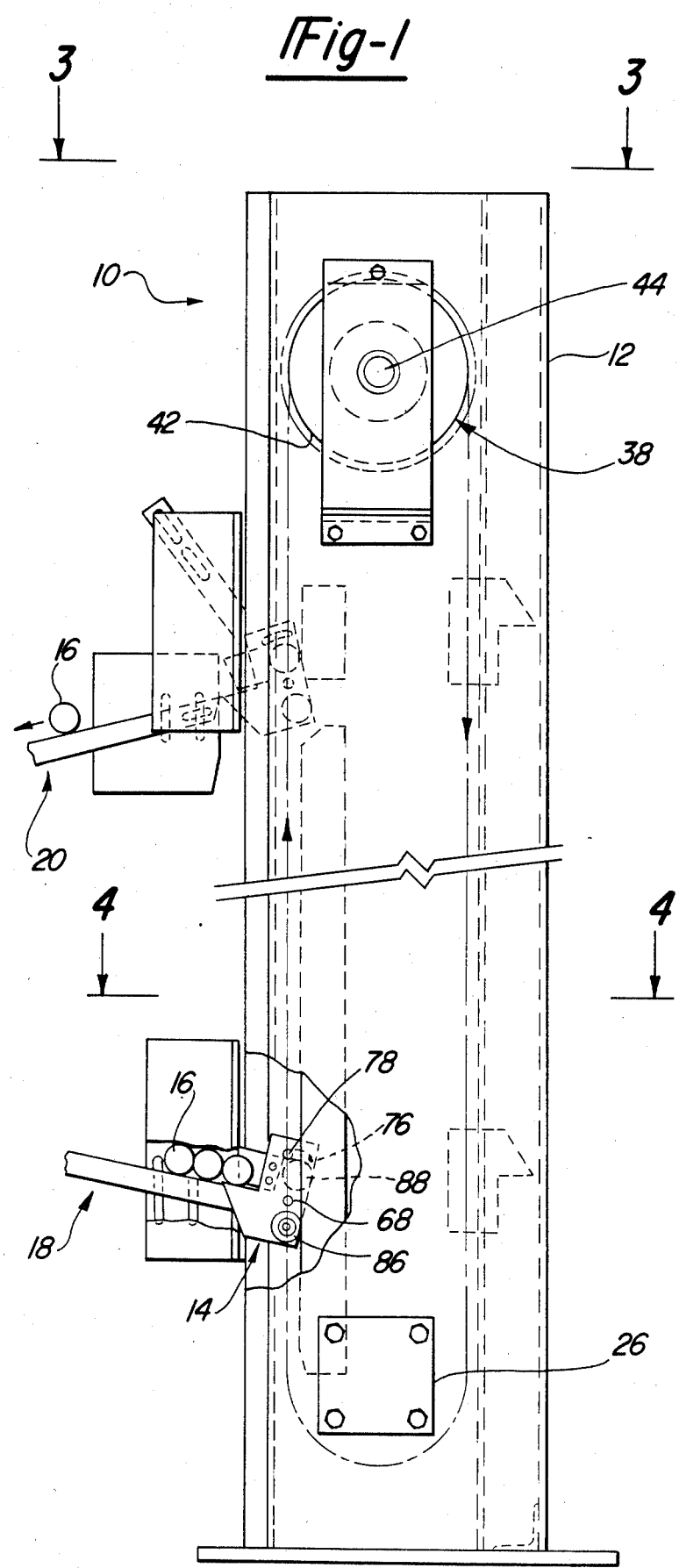
FIG. 1 is a side view of a workpiece elevator according to a first embodiment of this invention with a center portion thereof broken away.

A workpiece elevator in accordance with the first embodiment of this invention is shown in FIGS. 1 through 4 and is generally designated by reference number 10. Workpiece elevator 10 principally comprises frame assembly 12 and a plurality of bucket assemblies 14 which are employed to move workpieces 16 from intake station 18 to an elevated discharge station 20.

Frame assembly 12 includes a pair of separated and facing channels 22 and 24. Drive sprocket assembly 26 is mounted to the lower end of frame assembly 12 and includes a drive motor which rotates a pair of separated sprockets 28 and 30, which are fastened to shaft 32 for rotation. Sprockets 28 and 30 have projecting teeth which engage chains 34 and 36. Top sprocket assembly 38 is mounted at the uppermost portion of frame assembly 12, is non-driven, and includes sprockets 40 and 42 which are fastened to shaft 44 for rotation. Sprockets 40 and 42, like sprockets 28 and 30, include radially projecting teeth which intermesh with chains 34 and 36. Elongated L-channels 46 and 48 are mounted to channels 22 and 24, respectively, to define a flow path for chains 34 and 36 along the front side of elevator 10 where intake station 18 and discharge station 20 are located. Similarly, L-channels 50, 52, 54 and 56 are mounted to the frame members to provide guide paths for chains 34 and 36 along the rear side of frame assembly 12. U-shaped channels 58 and 60 are disposed within frame assembly 12 and provide a mounting location for cam bar components which are described in further detail below.

As shown in FIG. 1, clockwise rotation of drive sprockets 28 and 30 cause chains 34 and 36 to be moved such that they ascend on the left side of the elevator, as shown in FIG. 1, and descend on the right side of the elevator, as designated by the arrows in that figure.

Bucket assembly 14 is best described with reference to FIG. 2. Bucket assembly 14 includes a generally L-shaped bucket plate 62 having generally perpendicular workpiece supporting surfaces 64 and 66. Bucket plate 62 has a first bore 68 with bearing assembly 70 welded or otherwise connected to bucket plate 62 surrounding the bore. Bolt 74 passes through the pivot between connected links of chains 34 and 36, and through bore 68. Bearing assembly 70 enables bucket plate 62 to rotate about bolt 74. Arcuate slot 76 is provided within bucket plate 62 and is positioned so that bolt 78 is trapped within the slot. Bolt 78, like bolt 74, passes through a junction between adjacent chain links. Slot 76 serves to limit the angular range of rotation of bucket plate 62 about bolt 74.

Workpiece supporting blades 80 and 82 provide lateral support for workpieces 16 and are affixed to bucket plate 62 using fasteners 84. Spacers 85 are used to separate blades 80 and 82 by a distance slightly greater than the width of workpieces 16. Work supporting surfaces 64 and 66, in combination with blades 80 and 82, support workpieces 16 as they are being conveyed.

Cam follower 86 in the form of a roller bearing is attached to bucket plate 62 on one side of the plate. Cam follower 88, also in the form of a roller bearing, is attached to bucket plate 62 above shaft 74 and on the opposite surface from cam follower 86. Cam follower 86 interacts with elongated cam bar 90 such that when they are in contact, a bucket assembly 14 is rotated in a clockwise-workpiece engaging position, as shown in FIG. 2. When bucket assembly 14 is in the workpiece engaging position, surface 66 is inclined from a level orientation to urge the workpiece against surface 64, thus holding the workpiece. When cam follower 88 engages cam bar 92, bucket assembly 14 is urged to rotate in a counterclockwise-workpiece discharging position such that the workpiece is permitted to roll off surface 66. Cam bars 90 and 92 are longitudinally displaced so that they do not simultaneously engage bucket assembly 14, which would cause mechanical binding. Cam bars 90 and 92 are fastened to U-channels 60 and 58, respectively, and their positions can be adjusted along the U-channels by loosening mounting fasteners 94. Cam bars 90 and 92 have chamferred surfaces to gradually engage and disengage the associated cam followers.

Figure 2:
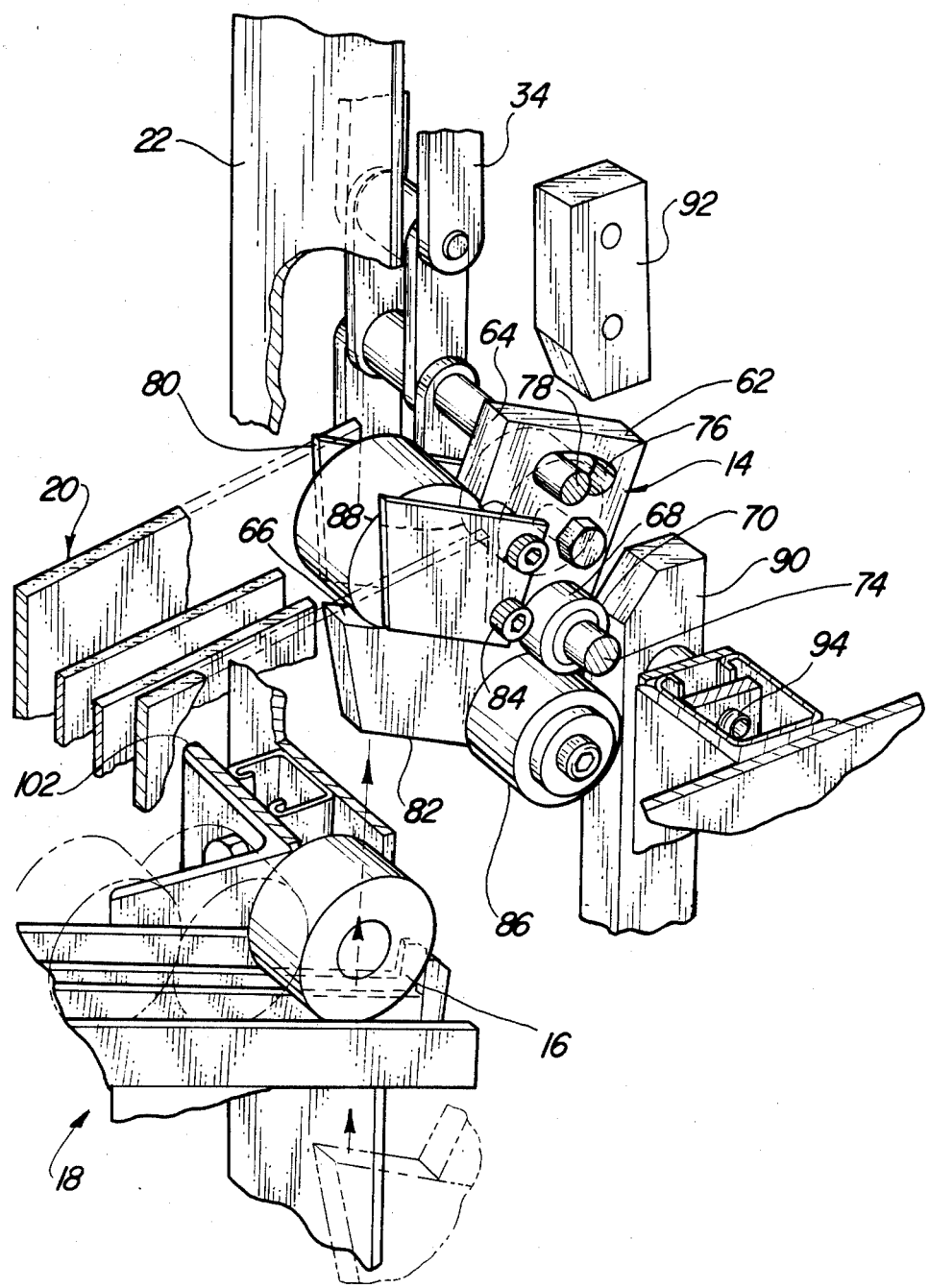
FIG. 2 is a pictorial view of the bucket assembly and intake and discharge track components of the workpiece elevator shown in FIG. 1 and further showing the interaction of the cam bars with the bucket assembly.
Figure 3:
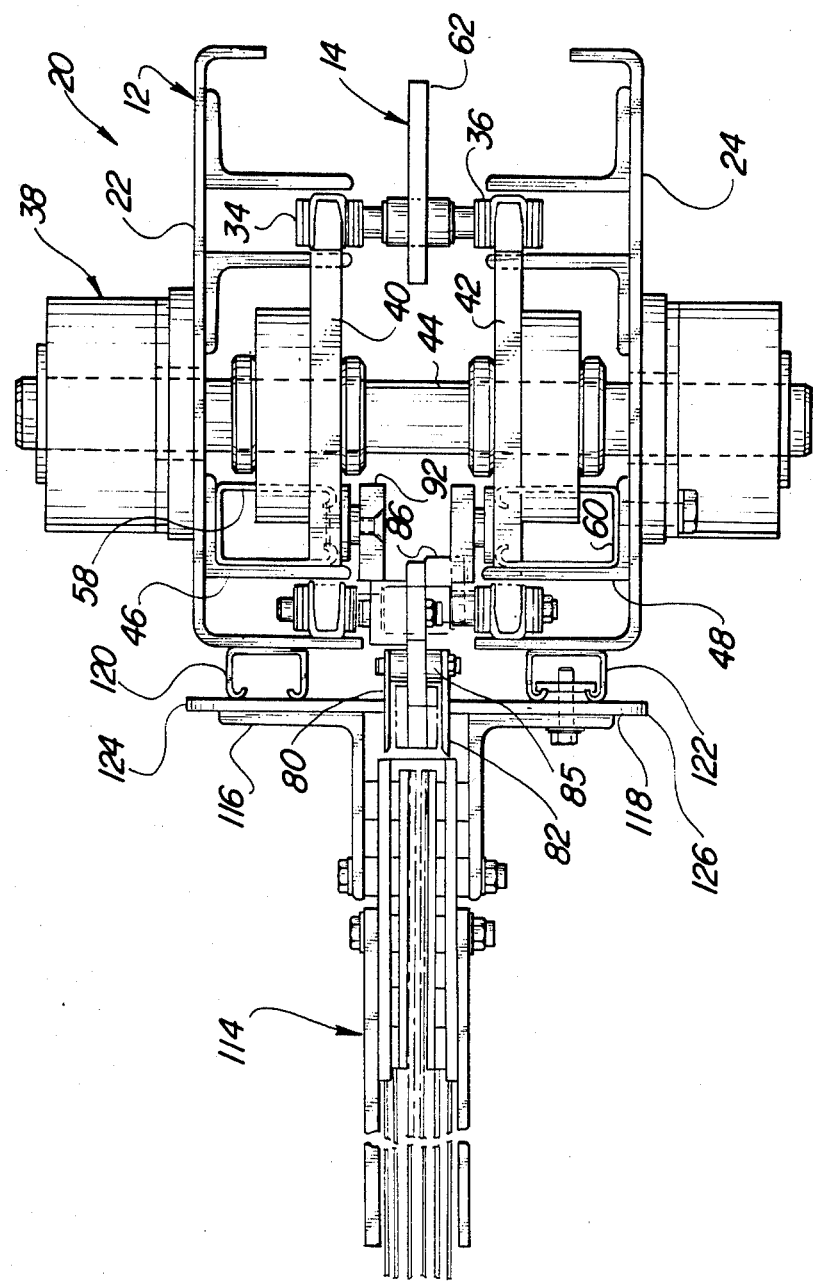
FIG. 3 is a top view of the workpiece elevator taken generally in the direction of arrows 3 in FIG. 1, particularly showing the discharge station of the elevator.
Figure 4:
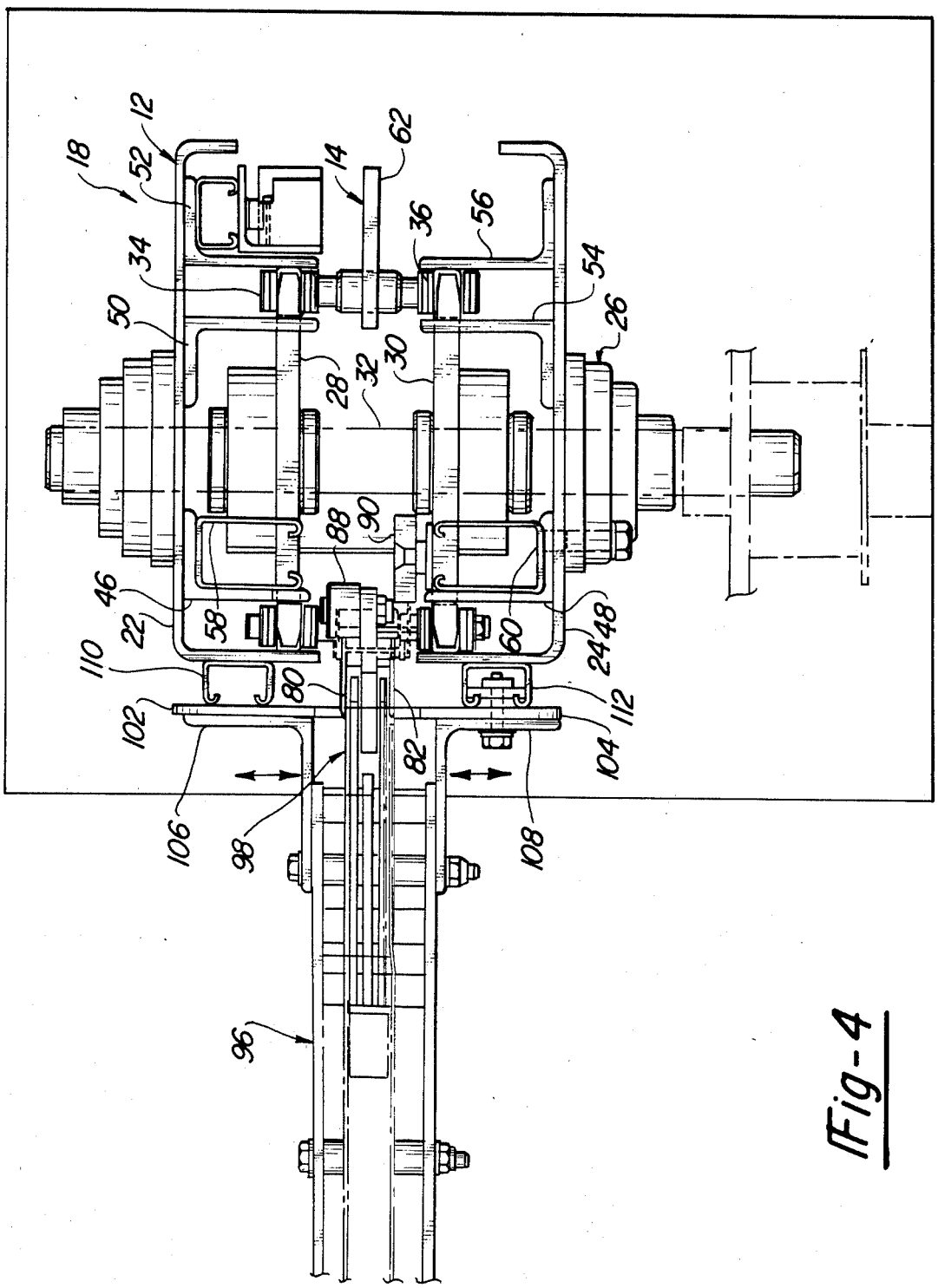
FIG. 4 is a top view of the workpiece elevator taken generally in the direction of arrows 4 in FIG. 1, particularly showing the details of the intake station of the elevator.

Intake station 18 is best shown in FIGS. 2 and 4 and includes intake track assembly 96 which guides workpieces 16, shown in the form of a gear blank, from a storage location to elevator 10. Track assembly 96 includes an L-shaped stop plate assembly 98 which positions workpieces 16 to properly engage bucket assemblies 14. Stop plate assembly 98 is made from two separated parallel plates such that bucket plate 62 passes between the plates and blades 80 and 82 pass outside them. L-channels 106 and 108 are affixed to U-channels 110 and 112 and position track assembly 96. Positioning plates 102 and 104 guide bucket assemblies 14 past stop plate assembly 98.

Discharge station 20 includes discharge track assembly 114 which is affixed to frame assembly 12 by L-channels 116 and 118 which are attached to U-channels 120 and 122. L-channels 116 and 118 may be a continuation of L-channels 106 and 108, and likewise, U-channels 120 and 122 may be a continuation of U-channels 110 and 112, or these components may be separate. Positioning plates 124 and 126 act on bucket assemblies 14 to position the bucket assembly as it passes through discharge station 20. Once a bucket assembly 14 reaches discharge station 20, it is cammed to rotate in a counterclockwise direction to release workpiece 16, which is then able to roll down track assembly 114 to another work station or storage area.

FIGS. 5 through 7 illustrate a second embodiment of a workpiece elevator in accordance with this invention which is generally designated by reference number 210. A number of components of elevator 210 are identical to those employed in connection with the first embodiment and are therefore identified by like reference numbers. Workpiece elevator 210 is particularly adapted for being easily modified to accommodate various workpiece sizes and configurations. This feature is provided through the use of modified bucket assembly 212 and intake and discharge stations 214 anad 216, respectively.

Bucket assembly 212 includes an elongated leg 218 which defines workpiece supporting surface 220. Bucket plate 222, like the first embodiment, includes bore 224 and bearing assembly 226 for rotatably mounting the bucket assembly about bolt 228 attached to chains 34 and 36. Similarly, bolt 230 passes through elongated slot 232 to control the degree of rotation of bucket assembly 212. Cam followers 234 and 236 are also affixed to bucket plate 222 and are engageable with cam bars 238 and 240.

Unlike the first embodiment, bucket assembly 212 does not include blades for lateral restraint of the workpieces. Instead, elongated workpiece guide L-channels 242 and 244 are provided which extend vertically between intake station 214 and discharge station 216. L-channels 242 and 244 are affixed to frame 246 via U-channels 248 and 250. L-channels 242 and 244 are provided with laterally engaged slots (243 and 245) with fasteners 256 passing therethrough. Guide plates 252 and 254 guide bucket plate 222 in the regions of intake station 214 and discharge station 216. In order to accommodate the various lateral widths of workpieces 16, the user merely needs to loosen fasteners 256 and change the separation between L-channels 242 and 244. Accordingly, there is no need to separately remove blades 80 and 82 necessary in conjunction with the first embodiment for each bucket assembly to change their separation distance.

Intake track assembly 264 is attached to elevator 210 by L-channels 272 and 274, which in turn are fastened to U-channels 276 and 278 which are welded to L-channels 242 and 244. Since U-channels 276 and 278 present an elongated slot, the vertical positioning of L-channels 272 and 274 and intake track assembly 264 is easily adjusted. This adjustability of the positioning of track 264 simplifies adaptation of elevator 210 to different applications and needs.

Intake station 214 of the second embodiment includes L-shaped stop plate 258 which is adjustably positioned via fasteners 260 and 262. Elongated slots are provided within stop plate 258 so that the stop position of the workpieces against upstanding leg 265 can be adjusted. This feature enables the number of workpieces which are loaded onto bucket assembly 212 to be adjusted. For example, stop plate 258 could be adjusted so that only one workpiece 16 is loaded onto bucket assembly 212, which is then carried to discharge station 216 and unloaded. Alternatively, stop plate 258 could be adjusted so that two (as shown in FIG. 5) or more workpieces are positioned to be engaged by bucket assembly 212. In other respects, workpiece elevator 210 operates like that of elevator 10 previously described, in that workpieces flowing along intake track assembly 264 of intake station 214 are moved to discharge station 216 where they interact with cam bar 240 to be unloaded and conveyed along discharge track assembly 226.

While the above description constitutes the preferred embodiments of the present invention, it will be appreciated that the invention is susceptible to modification, variation and change without departing from the proper scope and fair meaning of the accompanying claims.

What is claimed is:

1. A workpiece elevator for moving workpieces from an intake station to an elevated discharge station comprising:
   a frame assembly including vertically elongated frame members,
   a lower sprocket assembly having a pair of separated sprockets,
   an upper sprocket assembly having a pair of separated sprockets, drive means for driving at least one of said upper or lower sprocket assemblies, a pair of chains engageable with said sprockets and movable therewith such that said chains are separated and move simultaneously and upwardly along one side of said frame and downwardly along an opposite side of said frame, a bucket assembly including a generally L-shaped bucket plate, a first shaft passing through said bucket plate and engaging said chains enabling said bucket plate to rotate about said first shaft, said bucket plate further defining an arcuate-shaped slot, a second shaft engaging said chains and passing through said slot, thereby controlling the range of angular rotation of said bucket plate about said first shaft, a first cam follower disposed on one side surface of said bucket plate, a second cam follower disposed on an opposite side surface of said bucket plate, a pair of laterally separated blades attached to said bucket plate, said blades acting to laterally retain said workpieces, a first cam bar affixed to said frame assembly engageable with said first cam follower to urge said bucket assembly to be rotated to a first rotated position for engaging said workpiece, and a second cam bar engageable with said second cam follower for rotatably urging said bucket assembly to move to a work discharge position whereby, when said bucket assembly passes adjacent said intake station, said bucket assembly is rotated to said first position, thus accepting said workpieces and when said bucket assembly reaches said discharge station, said bucket assembly is rotated to said second position, thus discharging said workpieces.

2. The workpiece elevator according to claim 1 wherein said inlet station includes an elongated L-shaped stop plate which positions said workpieces to be accepted by said bucket assembly.

3. The workpiece elevator according to claim 2 wherein said stop plate comprises a pair of similarly shaped laterally displaced plates positioned such that said bucket plate passes between said stop plates and said blades pass around said stop plates when said bucket assembly passes through said intake station.

4. A workpiece elevator for moving workpieces from an intake station to an elevated discharge station comprising:

a frame assembly including vertically elongated frame members, a lower sprocket assembly having a pair of separated sprockets, an upper sprocket assembly having a pair of separated sprockets, drive means for driving at least one of said upper or lower sprocket assemblies, at least one chain engageable with said sprockets and movable therewith in response to rotation of one or both of said sprocket assemblies, a bucket assembly including a generally L-shaped bucket plate coupled to said chain for movement therewith, first and second elongated L-shaped channels affixed to said frame, said L-shaped channels including a first elongated portion and a second elongated portion, said first and second elongated portions being substantially transverse to one another, said first elongated portion of said channels supporting said workpieces laterally as they are transported from said intake station to said discharge station, and slot means associated with said second elongated portion of said channels for adjusting the lateral separation between said first and second channels whereby said elevator may be adjusted to accommodate workpieces of various lateral widths.

5. The workpiece elevator according to claim 4 wherein said intake station includes an elongated L-shaped stop plate which positions said workpieces to be accepted by said bucket assembly.

6. The workpiece elevator according to claim 5 wherein said stop plate comprises a pair of similarly shaped laterally displaced plates positioned such that said bucket plate passes between said stop plates when said bucket assembly passes through said inlet station.

7. The workpiece elevator according to claim 5 further comprising means for adjusting the position of said stop plate relative to said bucket assembly, thereby enabling the number of workpieces loaded onto said bucket assembly to be adjusted.

8. The workpiece elevator according to claim 4 wherein said intake station includes a track assembly for feeding workpieces to said elevator and means for vertically adjusting the position of attachment of said track assembly to said elevator.

9. The workpiece elevator according to claim 8 wherein said means for vertically adjusting comprises third and fourth elongated channels fastened to said frame assembly, and a pair of attaching plates secured to said track assembly and said third and fourth channels.

10. A workpiece elevator for moving workpieces from an intake station to an elevated discharge station comprising:

a frame assembly including vertically elongated frame members, a lower sprocket assembly having a pair of separated sprockets, an upper sprocket assembly having a pair of separated sprockets, drive means for driving at least one of said upper or lower sprocket assemblies, a pair of chains engageable with said sprockets and movable therewith in response to rotation of one or both of said sprocket assemblies such that said chains are separated and move simultaneously, a bucket assembly including a generally L-shaped bucket plate, a first shaft passing through said bucket plate and engaging said chains enabling said bucket plate to rotate about said first shaft, said bucket plate further defining an arcuate-shaped slot, a second shaft engaging said chains and passing through said slot, thereby controlling the range of angular rotation of said bucket plate about said first shaft, a first cam follower disposed on one side surface of said bucket plate, a second cam follower disposed on an opposite surface of said bucket plate, a first cam bar affixed to said frame assembly engaging said first cam follower to urge said bucket assembly to be rotated to a first rotated position for engaging said workpiece, a second cam bar engaging said second cam follower for rotatably urging said bucket assembly to move to a second rotated position for discharging said workpieces whereby, when said bucket assembly passes adjacent said intake station, said bucket assembly is rotated to said first position, thus accepting said workpieces and when said bucket assembly reaches said discharge station, said bucket assembly is rotated to said second position, thus discharging said workpieces, first and second elongated channels affixed to said frame, said channels supporting said workpieces laterally as they are transported from said intake station to said discharge station, and means for adjusting the lateral separation between said first and second channels whereby said elevator may be adjusted to accommodate workpieces of various lateral widths.

11. The workpiece elevator according to claim 10 wherein said intake station includes an elongated L-shaped stop plate which positions said workpieces to be accepted by said bucket assembly.

12. The workpiece elevator according to claim 11 wherein said stop plate comprises a pair of similarly shaped laterally displaced plates positioned such that said bucket plate passes between said stop plates when said bucket assembly passes through said inlet station.

13. The workpiece elevator according to claim 11 further comprising means for adjusting the position of said stop plate relative to said bucket assembly, thereby enabling the number of workpieces loaded onto said bucket assembly to be adjusted.

14. The workpiece elevator according to claim 10 wherein said intake station includes a track assembly for feeding workpieces to said elevator and means for vertically adjusting the position of attachment of said track assembly to said elevator.

15. The workpiece elevator according to claim 14 wherein said means for vertically adjusting comprises third and fourth elongated channels fastened to said frame assembly, and a pair of attaching plates secured to said track assembly and said third and fourth channels.

16. A workpiece elevator for moving workpieces from an intake station to an elevated discharge station comprising:

a frame assembly including vertically elongated frame members, a lower sprocket assembly having a pair of separated sprockets, an upper sprocket assembly having a pair of separated sprockets, drive means for driving at least one of said upper or lower sprocket assemblies, at least one chain engageable with said sprockets and movable therewith in response to rotation of one or both of said sprocket assemblies, a bucket assembly including a generally L-shaped bucket plate coupled to said chain for movement therewith, means coupled with said L-shaped bucket plate and said chain for enabling rotational transverse movement of said L-shaped bucket plate with respect to said vertically elongated frame members from a first position at said intake station to a second position at said discharge station, first and second elongated L-shaped channels affixed to said frame, said L-shaped channels including a first elongated portion and a second elongated portion, said first and second elongated portions being substantially transverse to one another, said first elongated portion of said channels supporting said workpieces laterally as they are transported from said intake station to said discharge station, and slot means associated with said second elongated portion of said channels for adjusting the lateral separation between said first and second channels whereby said elevator may be adjusted to accommodate workpieces of various lateral widths.

* * * * *